(12) United States Patent
Baxter, Jr.

(10) Patent No.: US 6,385,306 B1
(45) Date of Patent: May 7, 2002

(54) AUDIO FILE TRANSMISSION METHOD

(76) Inventor: John Francis Baxter, Jr., 1083 N. Collier #248, Marco Island, FL (US) 34145

( * ) Notice: Subject to any disclaimer, the term of this patent is extended or adjusted under 35 U.S.C. 154(b) by 0 days.

(21) Appl. No.: 09/517,415

(22) Filed: Mar. 2, 2000

(51) Int. Cl.⁷ .............................................. H04M 11/00
(52) U.S. Cl. ............................... 379/88.13; 379/88.24; 379/93.28; 709/206
(58) Field of Search .......................... 379/88.13, 88.14, 379/88.16–88.25, 93.01, 93.12, 93.24, 93.26–93.28, 114.01, 114.1, 114.13, 142.04, 142.05, 142.06, 335.01–335.1; 370/351–356; 709/201, 203, 206

(56) References Cited

U.S. PATENT DOCUMENTS

| | | | |
|---|---|---|---|
| 4,567,512 A | | 1/1986 | Abraham |
| 4,590,516 A | | 5/1986 | Abraham |
| 5,557,659 A | * | 9/1996 | Hyde-Thomson ........ 379/88.13 |
| 5,680,511 A | * | 10/1997 | Baker et al. ................. 704/257 |
| 5,760,823 A | | 6/1998 | Brunson et al. |
| 5,812,870 A | | 9/1998 | Kikinis et al. |
| 5,841,979 A | | 11/1998 | Schulhof et al. |
| 5,867,494 A | | 2/1999 | Krishnaswamy et al. |
| 5,870,454 A | * | 2/1999 | Dahlen .................... 379/88.14 |
| 5,901,214 A | * | 5/1999 | Shaffer et al. .............. 379/220 |
| 5,903,630 A | * | 5/1999 | Collins .................... 379/88.24 |
| 5,933,475 A | | 8/1999 | Coleman |
| 5,945,989 A | | 8/1999 | Freishtat et al. |
| 5,996,006 A | | 11/1999 | Speicher |
| 5,999,525 A | | 12/1999 | Krishnaswamy et al. |
| 6,085,101 A | * | 7/2000 | Jain et al. .................... 455/500 |
| 6,205,432 B1 | * | 3/2001 | Gabbard et al. ............. 705/14 |
| 6,230,132 B1 | * | 5/2001 | Class et al. ................. 704/270 |

OTHER PUBLICATIONS

Excite, "What is Excite voicemail?", http://www.excite.com/Info/inbox/faq.dcg, Feb. 15, 2000.
American Voicemail Network, Internet Messaging Services, http://www.avnweb.net/html/ims.html, Feb. 15, 2000.
Onebox.Com, http://www.onebox.com/service/receiving.html, Feb. 15, 2000.
Getmessage.Com, Features, http://www.mgw03.getmessage.com/faq_features.html, Feb. 15, 2000.
Buzme.Com, "Stay Online . . . Stay In Touch?", http://www.buzme.com/index.html, Feb. 15, 2000.
Crocker, David H., Standard For The Format of ARPA Internet Text Messages, http://www.faqs.org/rfcs/rfc822.html, Feb. 15, 2000.
Motorola, Digital StarTAC Wireless Telephone User's Guide, p. 39.

* cited by examiner

Primary Examiner—Fan Tsang
Assistant Examiner—Roland G. Foster
(74) Attorney, Agent, or Firm—Anton J. Hopen; Smith & Hopen, P.A.

(57) ABSTRACT

A method of transmitting one or more audio file attachments in an electronic message from a telephone including the steps of dialing into a predetermined telephone number, sending one or more DTMF signals on the touch-tone telephone corresponding to a preselected email address wherein the one or more DTMF signals is associated with a predetermined alphanumeric character, assembling a string of alphanumeric characters by repeating the DTMF signal entry until the preselected email address has been completed, recording an audio voice message over the touch-tone telephone, converting the audio voice message into a digital audio file, attaching the digital audio file to an electronic message directed to the preselected email address, and transmitting the electronic message to the preselected email address.

4 Claims, 16 Drawing Sheets

| DTMF Entry with End Signal | System Interpretation / Action |
|---|---|
| * | <begin email address entry> |
| 2# | a |
| 66# | n |
| 8# | t |
| 666# | o |
| 66# | n |
| 1# | @ |
| 22# | b |
| 2# | a |
| 999# | y |
| 7# | p |
| 2# | a |
| 8# | t |
| 33# | e |
| 66# | n |
| 8# | t |
| 7777# | s |
| 11# | . |
| 222# | c |
| 666# | o |
| 6# | m |
| * | <end email address entry> |
| # | <begin voice message recording> |
| # | <end voice message record> |
| <menu> | <press 1 to send; 2 to replay; 3 to re-record; 4 to store in memory; 5 for text to voice reading of email address; |

FIG. 13

| End-User Speech | Voice Recognition System Interpretation / Action |
|---|---|
| <#> | <begin email address entry with DTMF signal> |
| "a" | a |
| "n" | n |
| "t" | t |
| "o" | o |
| "n" | n |
| "at" | @ |
| "b" | b |
| "a" | a |
| "y" | y |
| "p" | p |
| "a" | a |
| "t" | t |
| "e" | e |
| "n" | n |
| "t" | t |
| "s" | s |
| "dot com" | .com |
| <#> | <end email address entry with DTMF signal> |
| <*> | <begin voice message recording with DTMF signal > |
| <*> | <end voice message record with DTMF signal > |
| <menu> | <press 1 to send; 2 to replay; 3 to re-record; 4 to store in memory; 5 for text to voice reading of email address; |

AUDIO FILE TRANSMISSION METHOD

FIELD OF INVENTION

The present invention relates generally to a method of transmitting audio messages over a network, and more particularly, a method of recording and retrieving audio attachments to electronic mail by use of a touch-tone telephone.

BACKGROUND OF THE INVENTION

Electronic mail ("email") has proliferated as a common method of communication. Initial communications consisted of ASCII (American Standard Code for Information Interchange) text. In an ASCII file, each alphabetic, numeric, or special character is represented with a 7-bit binary number (a string of seven 0s or 1s). 128 possible characters are defined. However, basic ASCII text email messages have progressed to include graphics, audio and even video. Graphic images, digital audio files and digital video all require an encoding and decoding process when transmitted over the Internet. A user wishing to encode a voice message and send the message to a preselected email address had to accomplish several steps and have certain hardware and software equipment. The user would typically record their voice message on a computer using a sound card attached or integrated into the motherboard of a computer.

The voice message is a sequence of analog signals that are converted to digital signals by the audio card, using a microchip called an analog-to-digital converter (ADC). When sound is played, the digital signals are sent to the speakers where they are converted back to analog signals that generate varied sound.

Audio files are usually compressed for storage or faster transmission. Audio files can be sent in short stand-alone segments—for example, as files in the WAV format. In order for users to receive sound in real-time for a multimedia effect, listening to music, or in order to take part in an audio or video conference, sound must be delivered as streaming sound. More advanced audio cards support wavetables, or precaptured tables of sound. The most popular audio file format today is MP3 (MPEG-1 Audio Layer-3).

Once these digital audio files reside on the hard drive of the user, the user would attach the file to an email sent to a selected recipient. When the file is attached, it might be transmitted in a standardized protocol such as Multi-Purpose Internet Mail Extensions (herein "MIME"). MIME is an extension of the original Internet e-mail protocol that lets people use the protocol to exchange different kinds of data files on the Internet: audio, video, images, application programs, and other kinds, as well as the ASCII handled in the original protocol, the Simple Mail Transport Protocol (SMTP). In 1991, Nathan Borenstein of Bellcore proposed to the Internet Engineering Task Force that SMTP be extended so that Internet (but mainly Web) clients and servers could recognize and handle other kinds of data than ASCII text. As a result, new file types were added to "mail" as a supported Internet Protocol file type.

Servers insert the MIME header at the beginning of any Web transmission. Recipients use this header to select an appropriate "player" application for the type of data the header indicates. Some of these players are built into the Web client or browser (for example, all browsers come with GIF and JPEG image players as well as the ability to handle HTML files); other components, such as audio file players, may need to be downloaded.

U.S. Pat. No. 5,945,989 to Freishtat et al. describes a method of adding or altering the content of a website by using a touch-tone telephone. Freishtat et al. describes a processing of converting a telephone message into an audio file which can then be posted on a website (col. 2, lines 19–22; col. 4, lines 33–34; and col. 5, lines 6–7 There is also a suggestion that the handset on a touch-tone telephone operates as "a kind of substitute computer keyboard." (col. 2, lines 26–27 and col. 22, lines 24–26). However, the patent does not describe or suggest any means for transmitting the audio file by email. Nor does the touch-tone telephone entry describe or suggest a method of keying in any alphanumeric character based on the number of times the telephone button is depressed within a specified wait loop. Rather, the Freishtat et al. patent requires the user to establish a pre-existing touch-tone ID for each page element. (col. 6, lines 48–49; col. 9, lines 62–65; and col. 10, lines 3–4). Accordingly, while the Freishtat et al. patent describes a method of digitizing recorded audio from a touch-tone telephone to a file for publication on a web server, there is no description nor suggestion that the recording of the audio file would be transmitted to a predetermined email recipient. Furthermore, there is no teaching or suggestion for a method of keying in the necessary array of alphanumeric characters to properly designate an email recipient over a touch-tone telephone without pre-existing email address identifiers.

U.S. Pat. No. 5,996,006 to Speicher describes an online dating service that converts audio files received via telephone into digital files for retrieval on the Internet. (col. 5, lines 27–29 and col. 6, lines 37–39). However, the Speicher patent does not describe nor suggest a method of directly sending the recorded audio file to a predetermined email recipient. Nor does the Speicher patent describe or teach a method of keying in the necessary alphanumeric characters necessary to establish a preselected Internet email address over a touch-tone telephone. (See col. 6, lines 60–63 wherein Speciher teaches that the email address must be recorded by audio, then later manually translated to alphanumeric form).

A number of companies such as Onebox.com, BuzMe.com, Inc., Getmessage.com, American Voicemail Network, Inc., and Excite, Inc. currently offer services wherein a pre-configured recipient account may be set up to receive email with audio file attachments originating from a regular voice mail system. However, in all of these systems, the recipient must set up an account in advance. Furthermore, these systems require the sender of the audio voice mail message to know ahead of time their voicemail telephone number which typically has a unique extension for that recipient.

Consequently, there is a need in the art for a method of transmitting digital audio file attachments to a preselected email address without requiring the recipient to first set up an account with a service.

There is a further need in the art for a method of transmitting digital audio file attachments wherein the only information required by the sender is to know the recipient's email address.

However in view of the prior art at the time the present invention was made, it was not obvious to those of ordinary skill in the pertinent art how the identified needs could be fulfilled.

SUMMARY OF THE INVENTION

The above and other objects of the invention are achieved in the embodiments described herein by providing a method of transmitting one or more audio file attachments in an electronic message from a touch-tone telephone comprising the steps of dialing into a predetermined telephone number, sending one or more DTMF signals on the touch-tone telephone corresponding to a preselected email address wherein the one or more DTMF signals is associated with a predetermined alphanumeric character, assembling a string of alphanumeric characters by repeating the DTMF signal entry until the preselected email address has been completed, recording an audio voice message over the touch-tone telephone, converting the audio voice message into a digital audio file, attaching the digital audio file to an electronic message directed to the preselected email address, and transmitting the electronic message to the preselected email address.

In a preferred embodiment, a subscriber record is maintained so that the caller does not need to repeatedly enter in the same email addresses. The steps involved for utilizing a subscriber record system comprise sending an identification code to a central server by sending DTMF signals on the touch-tone telephone, associating the identification code with a subscriber record, validating the authenticity of the subscriber record, and authorizing the transmission of the electronic message based upon whether the identification code is authentic.

When a recipient receives a message from the caller, the return email address will typically be that of the central server. It is preferable that the recipient have the ability to correspond directly back to the caller by email if possible. This is accomplished by associating an alphanumeric reply string with the subscriber record and encoding the alphanumeric reply string into the electronic message in a reply-to field wherein a recipient of the electronic message may send a return electronic message addressed to the alphanumeric reply string.

Electronic email addresses are unique and there is generally no margin of error if they are incorrectly entered. Therefore, it is important that the entry of the individual alphanumeric characters be as easy and seamless as possible. This may be performed by providing a wait loop of predetermined duration to identify the predetermined alphanumeric character, identifying the predetermined alphanumeric character according to the number of identical DTMF signals received during the wait loop, and appending the predetermined alphanumeric character as identified at the end of the wait loop.

For example, pressing the numeral "2" once within two second results in the alphanumeric character "2" being recorded by the server. Pressing the numeral "2" twice within two seconds results in the alphanumeric character "A" being recorded by the server. Pressing the numeral "2" three times within two seconds results in the alphanumeric character "B" being recorded by the server. Pressing the numeral "2" four times within two seconds results in the alphanumeric character "C" being recorded by the server. Pressing the number "1" once within two seconds results in the alphanumeric character "1" being recorded by the server. Pressing the number "1" twice within two seconds results in the alphanumeric character "@" being recorded by the server. Pressing the number "1" three times within two seconds results in the alphanumeric character "." being recorded by the server.

Additional steps to verify the correct email address of the proposed recipient may include providing a text-to-speech audio confirmation of the string of predetermined alphanumeric characters comprising the preselected email address. For even more specific confirmation, the text-to-speech confirmation is played upon determination of each alphanumeric character selected. Once the email address is entered and confirmed, the next set of preferred steps include prompting for the audio voice message by an automated voice response, recording the audio voice message, and detecting a DTMF stop signal.

The transmission of the audio voice messages presents a unique opportunity to disseminate information. Additional audio segments may be spliced into the original audio voice message for public service announcements, musical interludes, or commercial advertisements. Furthermore, such additional information is not limited to the audio segments of the email attachment, but may also be incorporated as text or graphic elements in the body of the electronic message. Accordingly, an additional step to the method describe above might include encoding a sponsor message into the electronic message wherein the encoding a sponsor message comprises the step of appending the digital audio file with an audio sponsor message. Alternatively, the method might include encoding a text-based sponsor message into the body of the electronic message or encoding a sponsor message comprises the step of encoding one or more graphic elements into the body of the electronic message.

There is also an opportunity to present additional information, not just to the recipient of the electronic message, but also to the sender by playing an audio sponsor message upon making a connection to the predetermined telephone number. In order to enhance the effectiveness of the audio sponsor message, another step might include selecting the audio sponsor message from an array of audio sponsor messages according to one or more demographic factors of the caller wherein the one or more demographic factors are resolved from a caller-ID string.

Accordingly, if the caller-ID string identifies the call is originating from Florida, the sponsor message selected from the array might include advertisements for suntan lotion but not snow shovels. Caller-ID strings may also be used in combination with other databases to provide more detailed demographics on the caller. For example, the method might include the additional steps of cross-referencing the caller-ID string against relative property values of the origin of the call, assigning a financial rating variable, and selecting the audio sponsor message from the array of audio sponsor messages according to the financial rating variable. For example, presenting a budget automobile advertisement to a caller originating from an area of high property values will probably be less effective than presenting a luxury automobile advertisement. In a further embodiment of the invention, the method includes the step of providing a DTMF menu option to transfer into a sponsor's call center system wherein further information on a sponsor's products or services may be obtained.

Electronic devices can easily reproduce the DTMF signals. In an alternative embodiment of the invention, a personal digital assistant (herein "PDA") device transmits the one or more DTMF signals through the touch-tone telephone. Popular PDAs include the 3COM PalmPilot® and Windows CE® devices. These PDAs have easy to use and sophisticated address book features. By utilizing a predetermined table of alphanumeric character to DTMF signal conversions, the PDAs can be programmed to dial into the predetermined telephone number and send the appropriate DTMF identifiers for a particular email address. However, in this embodiment, it would disadvantageous to utilize a wait loop for entry of the DTMF signals as the PDAs can produce the signals at a much faster rate than can be achieved by manually pressing the buttons on a touch-tone telephone. Therefore, to overcome this problem, an entry of one or more DTMF signals corresponding to the unique selection of the predetermined alphanumeric character is followed by a stop DTMF signal indicating acceptance of the predetermined alphanumeric character without utilizing the wait loop. Therefore, once the DTMF signal or combination of signals are received followed by the stop DTMF signal, the next alphanumeric character may be entered without waiting for a predetermined elapse of time.

Although speech recognition technology has advanced considerably, current technology generally requires high memory and CPU processing to enable most speech-to-text processes. This stems from the variations of speech between individuals and the tens-of-thousands of spoken words that must be recognized for most applications. However, in the case of speaking and translating individual alphanumeric characters, the memory and processing demands are exponentially less. Furthermore, individual alphanumeric character translations and less susceptible to the variations of speech and sound quality of telephone systems. Accordingly, in a preferred embodiment of the invention, entry of a preselected email address may be accomplished entirely through speech recognition means comprising the steps of dialing into a predetermined telephone number, receiving one or more speech elements through the telephone, associating each individual speech element with one or more predetermined alphanumeric characters through a speech recognition means, assembling a string of alphanumeric characters by repeating steps above until a preselected email address has been completed, recording an audio voice message over the telephone, converting the audio voice message into a digital audio file, attaching the digital audio file to an electronic message directed to the preselected email address, and transmitting the electronic message to the preselected email address.

In order the maintain the low CPU and memory requirements of the system, the one or more speech elements are substantially restricted to an individual alphanumeric character. However, certain common groupings may be detected wherein the phonetic equivalents of "dot com," "dot net," and "dot org" are associated with the alphanumeric character groupings of ".com," ".net," and ".org" respectively through the speech recognition means.

Other steps previously described above and utilizing DTMF signals may also be accomplished through speech recognition means including the steps of sending an identification code to a central server by the speech recognition means, associating the identification code with a subscriber record, validating the authenticity of the subscriber record, and authorizing the transmission of the electronic message based upon whether the identification code is authentic. As an alternative to the identification code, a single spoken code can be used to identify the caller and associate the call with the subscriber record based on the unique characteristics of the caller's speech. Such technology is well known in the field of biometrics.

Speech recognition may be incorporated into a wait loop assembly of the preselected email address by the steps of providing a wait loop of predetermined duration to identify the predetermined alphanumeric character, identifying the predetermined alphanumeric character according to the one or more speech elements received during the wait loop, and appending the predetermined alphanumeric character as identified at the end of the wait loop. In addition, the speech recognition can be used to signal the start and stop of the recording phase wherein the steps comprise prompting for the audio voice message by an automated voice response, recording the audio voice message, and detecting a speech element stop signal. The speech element stop signal should be a unique word or combination of words. For example, if part of the audio message included the phrase, "please do not stop sending our company such wonderful referrals," and the word "stop" was used as the stop signal, "sending our company such wonderful referrals" would not be included in the audio voice message as the recording phase would have already ended.

It is preferred that a combination of voice and DTMF signals are used in this case wherein the caller is prompted to depress a button on their touch-tone telephone to start and stop the recording process. DTMF functions particularly well even during concurrent speech as two discrete tones are emitted which are picked up and interpreted by telephone switches. The two tones represent each key on the telephone touch pad. (The "A", "B", "C", and "D" keys were used for the US military's Autovon phone system).

| 1 | 2 | 3 | A | 697 Hz |
| 4 | 5 | 6 | B | 770 Hz |
| 7 | 8 | 9 | C | 852 Hz |
| * | 0 | # | D | 941 Hz |
| 1209 Hz | 1336 Hz | 1477 Hz | 1633 Hz | |

When any key is pressed, the tone of the column and the tone of the row are generated, hence dual tone. As an example, pressing the '5' button generates the tones 770 Hz and 1336 Hz.

A preferred embodiment of the invention includes the step of associating the preselected email address with the subscriber record wherein the preselected email address may be retrieved at a later time without re-entry. To make the retrieval of the preselected email address as simple as possible, the method may include the step of tagging the preselected email address with a description audio file wherein the description audio file is played back through the touch-tone telephone for selecting a previously entered email address. When speech recognition capability is included, additional steps may comprise receiving a speech request associated with a previously entered email address, associating the speech request with the previously entered email address through voice recognition means, and confirming identification of the previously entered email address.

A particular problem that currently exists with many voice mail systems is the inability to easily archive the voice messages. In many situations, it would be advantageous to store the voice message in a particular file directory or associate the message with a particular contact. Popular contact management software such as Symantec's ACT!® and Microsoft's Outlook® are capable of organizing and storing binary files such as digital audio. While current voice mail systems permit the user to save a voice mail message, the user must continually cycle through the old messages to find the message of interest. By providing an easy to use, one-touch operation, voice messages stored on telecommunication devices, and particularly wireless devices which are often used outside a formal office setting, may be archived, stored and organized for later retrieval and use.

An embodiment of the invention includes a method of transmitting one or more audio file attachments in an electronic message from a telecommunications device having voice mail capability. The steps comprise storing one or more alphanumeric strings corresponding to one or more preselected email addresses in a telecommunications device, receiving an audio voice message into the telecommunications device, forwarding the audio voice message to a voice mail server, converting the audio voice message into a digital audio file, attaching the digital audio file to an electronic message directed to the preselected email address, and transmitting the electronic message to the one or more preselected email addresses. In a preferred embodiment, the one or more preselected email addresses are assigned to a single button, wherein the depression of the single button forwards the audio voice message to the voice mail server. While the telecommunication device is anticipated to be a wireless device such as a cellular telephone or pager, it may also include non-wireless telephone.

In addition, the telecommunication devices may be pre-configured to transmit an alphanumeric header string permitting the particular voice mail being forwarded to be associated with a particular contact or file directory on the recipient's computer. For example, if a user receives a voice message on his cellular telephone that relates to a business matter, he might assign a "01" value to the voice message before forwarding the message for ultimate delivery by email. The "01" value is associated with a business matter and is placed in the subject field of the email message. The recipient's email communication program is pre-configured to recognized the "01" value and automatically place the email and attached digital audio file into a predetermined file folder. In Microsoft Outlook® this procedure is called a "rule." Alternatively, the user might assign a value of "02" to the message which directs it to a file folder on the recipient's computer which holds personal voice messages.

Accordingly, it is an object of the present invention to provide a method of transmitting an audio voice message to an email address without the need of a separate CPU.

It is another object of the present invention to provide a method of transmitting an audio voice message to an email address without requiring a pre-configured voicemail account.

It is another object of the present invention to provide a method of transmitting an audio voice message to an email address without requiring a unique voicemail number or extension for the recipient.

An advantage of the invention is that callers are able to send an audio voice message to any email address without any other information such as telephone, address, extension numbers or the like.

Another advantage of the invention is that those wishing to send an audio voice message do not need to have any computer equipment.

Another advantage of the invention is that persons with disabilities that make if difficult to type regular messages can transmit communications through the Internet by simply pressing touch-tone buttons, or alternatively, by speaking the alphanumeric characters associated with an email address.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 13 is a DTMF to alphanumeric character translation table according to one embodiment of the invention wherein end-user speech is translated into the associated alphanumeric characters of a preselected email address.

DETAILED DESCRIPTION OF THE PREFERRED EMBODIMENT

Figure 1:
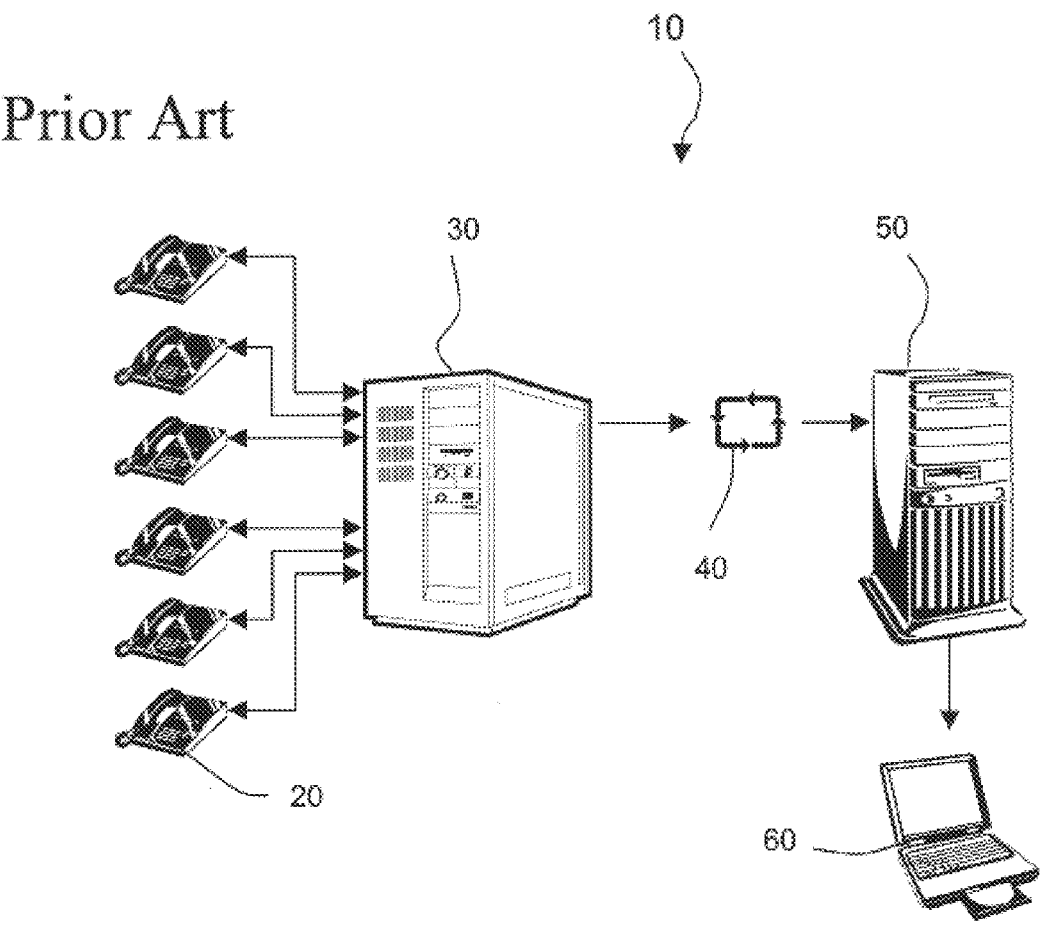
FIG. 1 is a schematic view of the prior art showing the method of encoding voice messages into email attachments received by a recipient.

Referring initially to FIG. 1, it will there be seen that an illustrative embodiment of the prior art is denoted by the reference number 10 as a whole. One or more telephone callers 20 dial into a voice mail server 30 and record an audio voice message. In the prior art, it is necessary to dial a unique telephone number or unique telephone extension associated with the particular recipient. Once the audio voice message is stored on the voice mail server 30, it can be encoded and attached 40 into an email addressed to the recipient and stored on an email server 50. The recipient 60 downloads the email and decodes the attached audio file to hear the original voice message. The fundamental limitation in this system is the requirement that the recipient 60, have a pre-existing account on the voice mail server 30 in addition to the requirement that the caller 20 must know which telephone number or telephone number with extension to dial in the first place.

Figure 2:
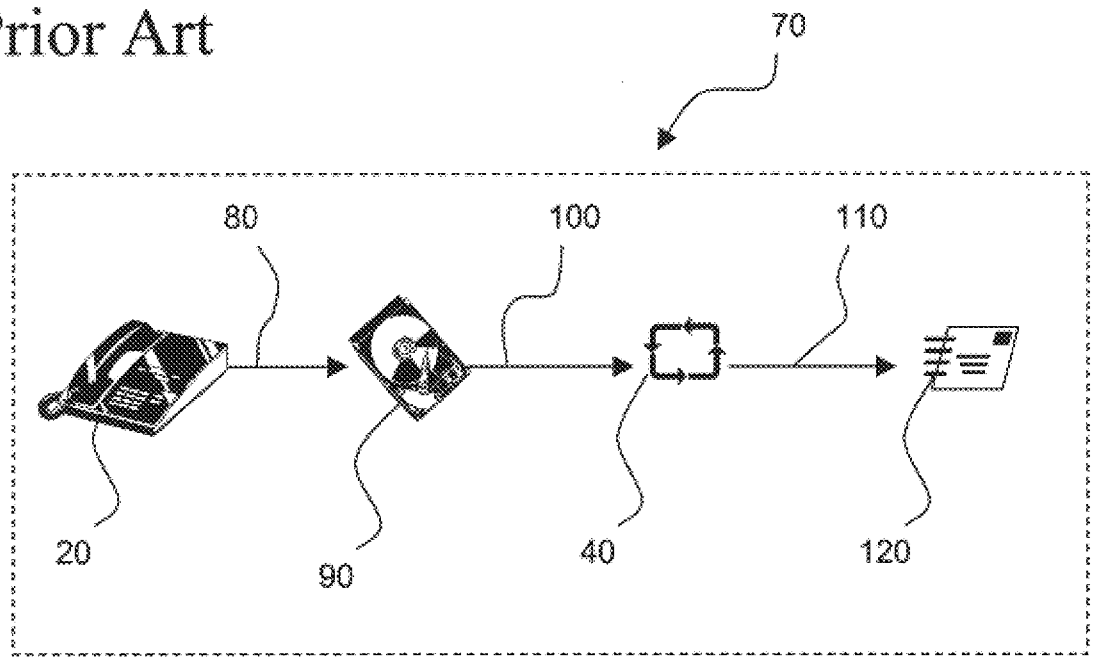
FIG. 2 is a schematic view of the prior art process of encoding a digital audio file onto a hard drive, attaching it to an email and transmitting the same.

FIG. 2 illustrates the general audio encoding process 70 of the prior art. The telephone caller 20 leaves an audio voice message which is digitized and stored 80 on a hard drive 90 as a digital audio file which is then associated 100 with a predetermined email address and encoded and attached 40 into an email message. The message is then saved 110 in an email server where it is then transmitted 120 to the recipient's email account.

Figure 3:
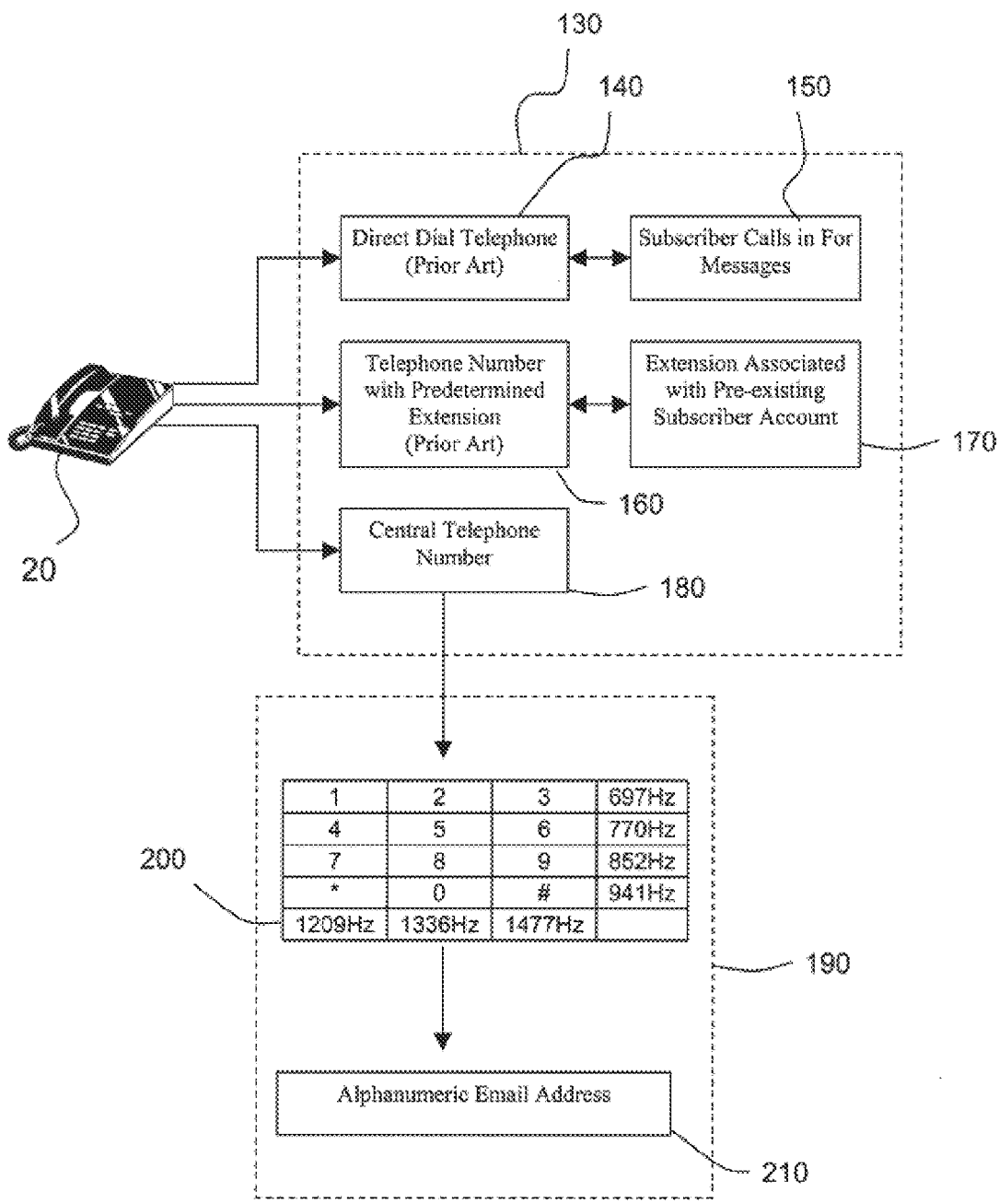
FIG. 3 is a schematic view of the general process of resolving an alphanumeric email address from a table of twelve possible DTMF signals found on a typical touch-tone telephone.

FIG. 3 illustrates the general process of resolving an alphanumeric email address from a table of twelve possible DTMF signals found on a typical touch-tone telephone wherein a caller 20 might have a group 130 of possible telephone numbers to dial. The first might be the recipient's direct dial telephone number 140 found in the original voice mail systems wherein the recipient dials back into the voice mail server 150 to retrieve the messages. The second choice might be to utilize a telephone number with a predetermined extension 160 assigned to the recipient's account 170 to later encode and transmit the audio file attachment in an email as described in FIG. 1. The third choice involves the instant invention wherein the caller 20 dials into a central telephone number 180 without the need to know any pre-existing information about the recipient other than his or her email address. The DTMF to alphanumeric character interpretation 190 generally comprises associating an individual alphanumeric character to one or more DTMF signals possible from standard DTMF protocol 200. Once a string of alphanumeric characters are resolved 210, the voice message may be recorded and transmitted to the email address represented by the string of alphanumeric characters.

Figure 4:
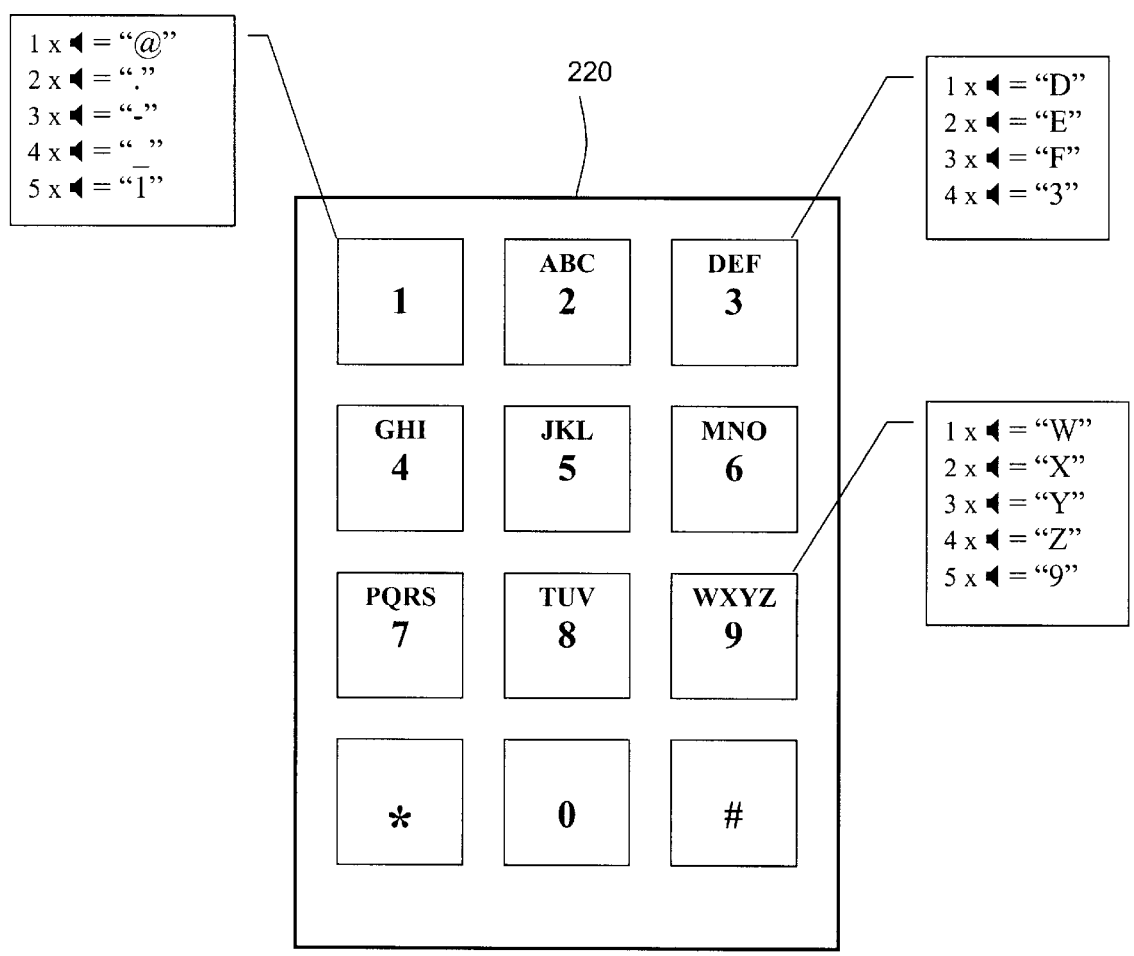
FIG. 4 is a schematic illustration of a possible DTMF to alphanumeric character interpretation on a typical touch-tone telephone.

Of course, it is apparent that the number of unique DTMF signals available from the standard DTMF protocol 200 available on a typical, non-military telephone is woefully inadequate to produce the 40 to 50 required alphanumeric characters needed to resolve an email address. Accordingly, one possible method of identifying a unique alphanumeric character is by discerning a plurality of alphanumeric characters based on the number of times a button on a touch tone telephone is depressed. In FIG. 4, a touch tone telephone keypad 220 is depicted wherein the depression the "1" button once identifies the "@" character which is required for all Internet email addresses between the user account name and the domain name information. Depressing the "1" button twice identifies the "." character. Depressing the "1" button three times identifies the "-" character, and so on.

Figure 5:
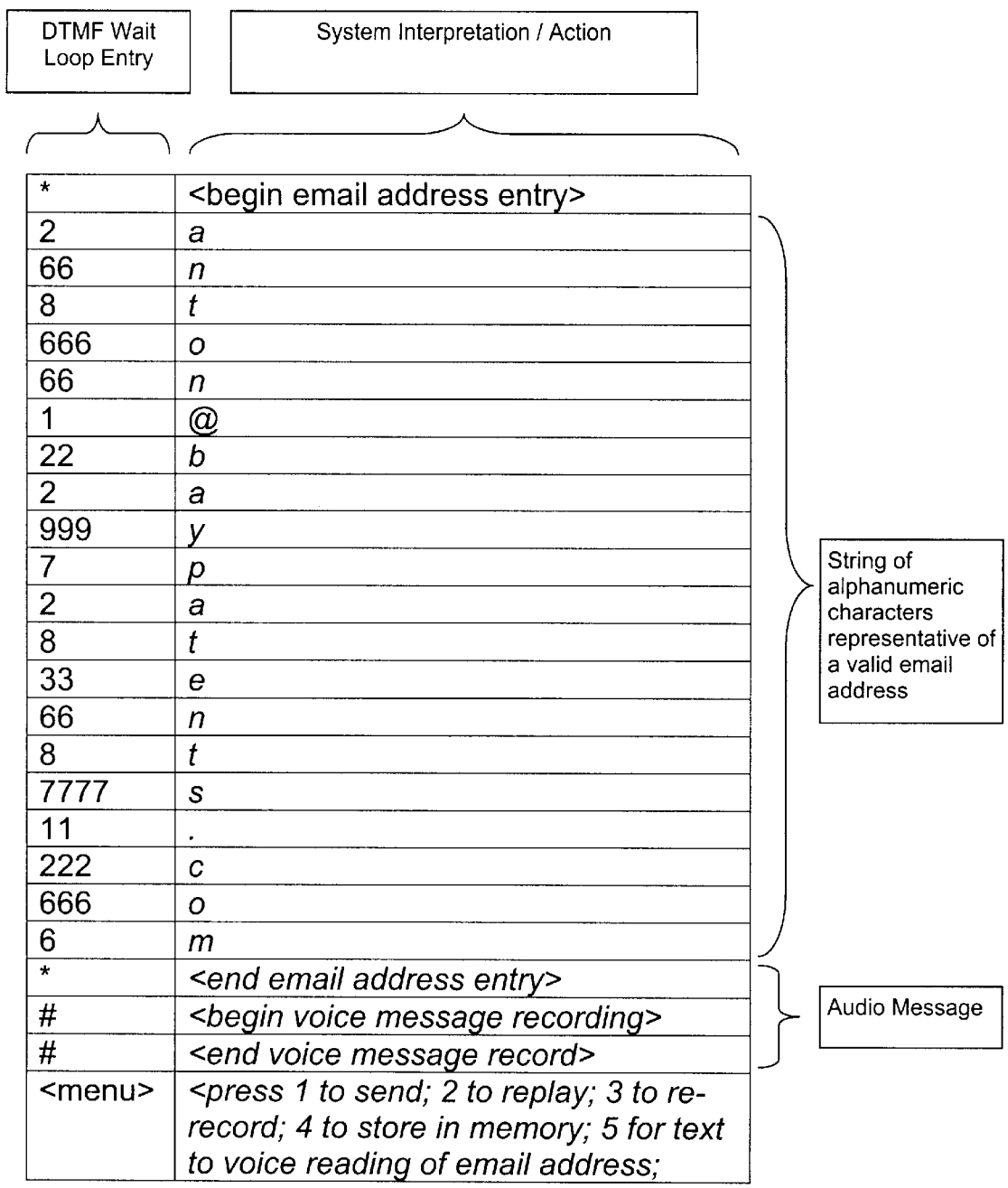
FIG. 5 is a DTMF to alphanumeric character translation table according to one embodiment of the invention. In this embodiment, a wait loop is employed before each individual entry is interpreted.

In FIG. 5 a table is provided to illustrate the process of keying in an email address. The "*" character on the touch-tone telephone is assigned to signal the beginning of an email address entry. Pressing the numeral "2" on the keypad 220 once yields an alphanumeric equivalent of the letter "a." Pressing the numeral "6" twice, or "66" yields an alphanumeric equivalent of the letter "n." In a preferred embodiment, the association between the keypad 220 numeral and the associated alphanumeric equivalent is cor- related to the standard letters typically printed on the buttons of touch tone telephones (e.g., ABC for the numeral 2; DEF for the numeral 3; GHI for the numeral 4; JKL for the numeral 5; MNO for the numeral 6; PQRS for the numeral 7; TUV for the numeral 8; and WXYZ for the numeral 9).

Figure 6:
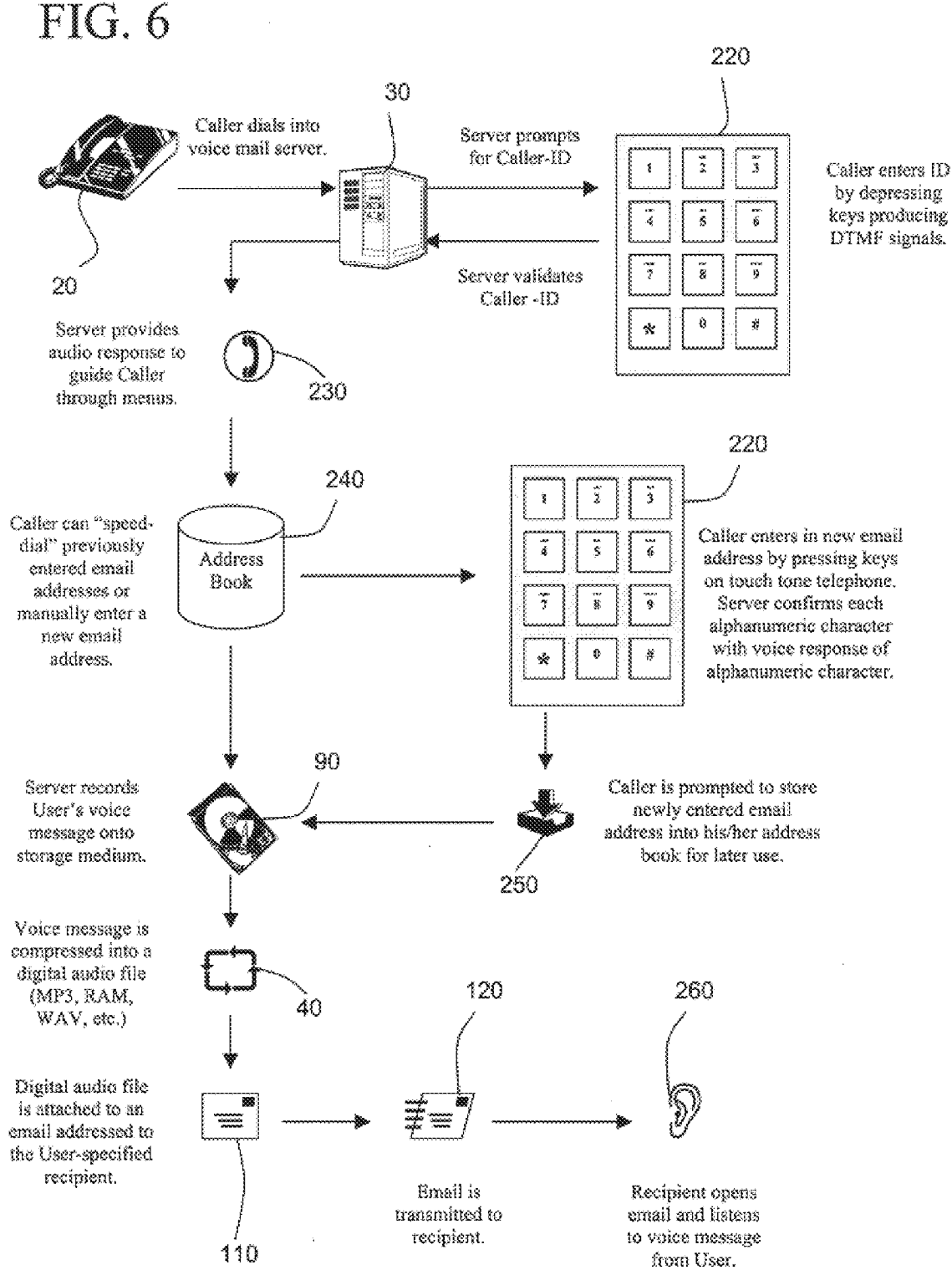
FIG. 6 is a schematic view of an embodiment of the invention.

FIG. 6 is representative of the method of the invention wherein a caller 20 dials into a voice mail server 30 which prompts the caller 20 for identification. The caller 20 enters in an identification code on the touch-tone telephone keypad 220. The voice mail server 30 validates the identification code and provides audio response messages 230 to guide the caller 20 through the system menus. The caller 20 can retrieve previously entered numbers in his or her address book 240 or may manually enter a new email address using the touch-tone telephone keypad 220. After the initial entry of a new email address, the caller 20 has the option of storing 250 the email address in his or her address book 240 for later retrieval. The voice mail server 30 then records the caller's audio voice message 90 onto a storage medium. The voice message is compressed and encoded into a digital audio file 40 and then attached to the email address previously identified 110. The email and digital audio file attachment is then opened and listened to by the recipient 260.

Figure 7:
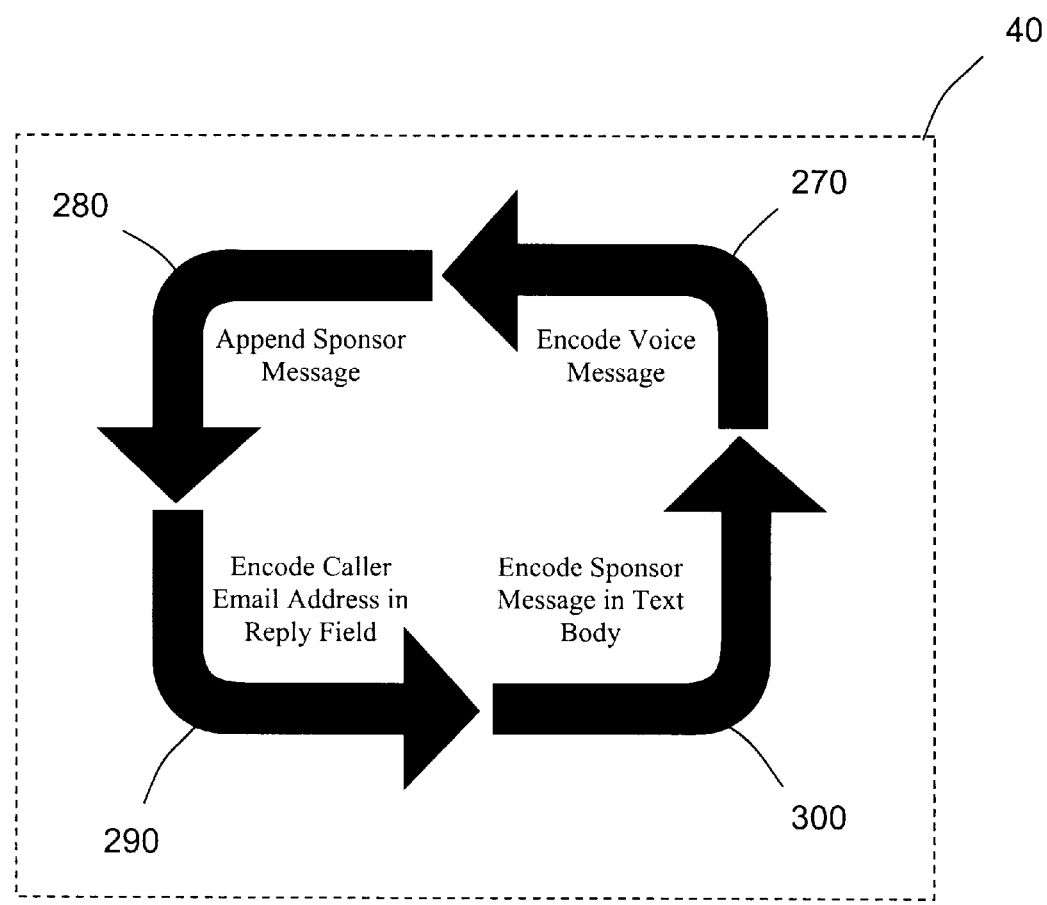
FIG. 7 is a schematic view of the encoding process for audio and text sponsor messages.

FIG. 7 is a detailed illustration of an audio file encoding process comprising the steps of encoding the caller's voice message 270, appending a sponsor message 280, encoding the caller's email address in the reply field 290 of the email message and encoding a sponsor message in the text body 300 of the email message. If a sponsor message 280 is to be encoded, it is preferred that it be prior to the caller's voice message to ensure that the content will be listened to by the recipient. Encoding the caller's email address in the reply field 290 of the email message provides convenience to the recipient wherein the recipient can communicate back to the caller by replying to the email message. Of course, the invention does not require the caller to even have an email account, so in that case, the reply field of the email message may simply indicate the email or central server that encoded and sent the original message.

Figure 8:
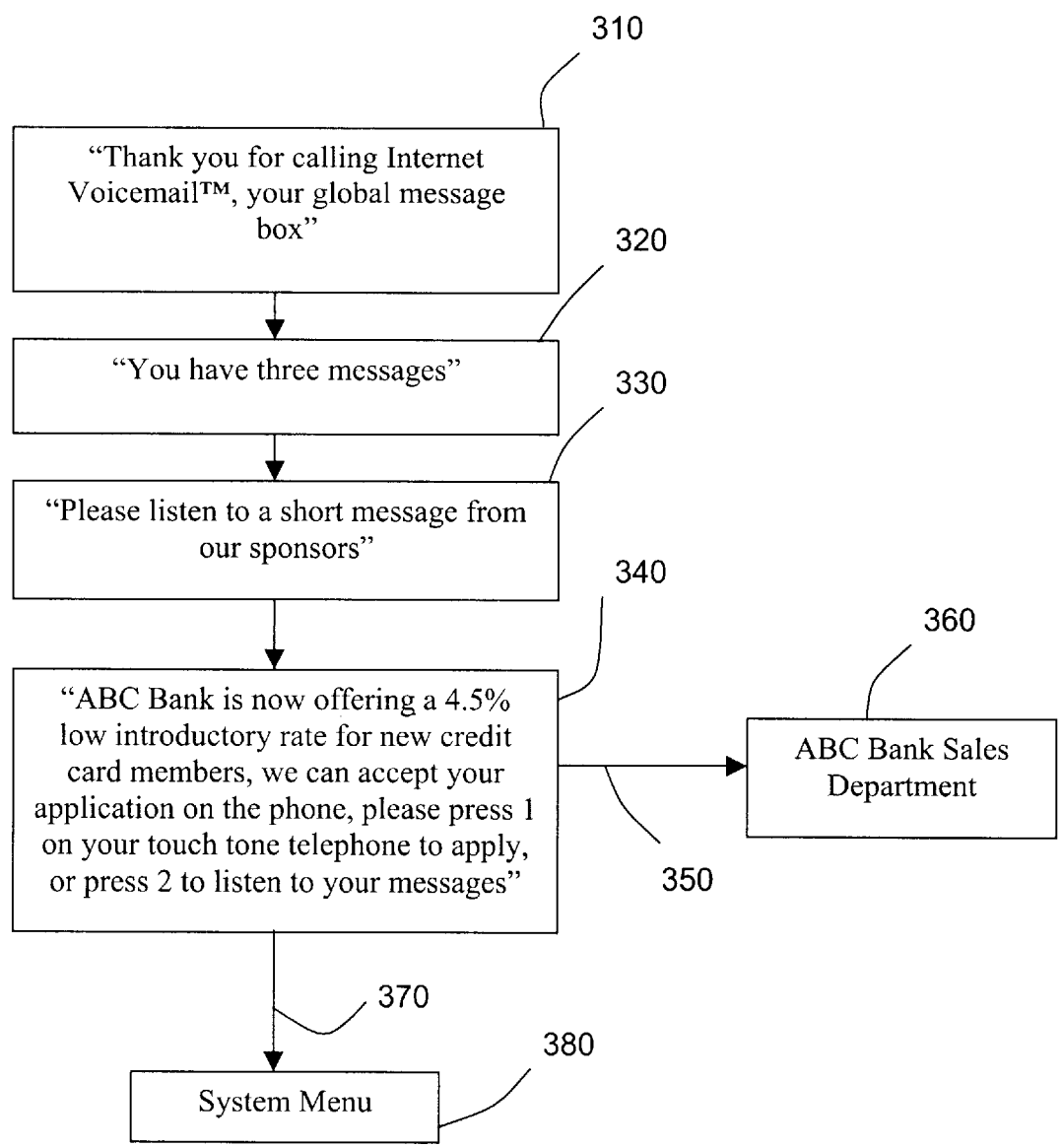
FIG. 8 is a schematic view of an embodiment of the invention wherein sponsor messages are introduced to the caller and a link to the sponsor's own call center is provided via the detection of a DTMF signal ("1").

FIG. 8 illustrates an embodiment of the invention wherein the caller is presented with a sponsor message. In the example, the greeting is presented to the caller 310. The voice mail system indicates that the caller has three messages 320. An important feature of the present invention is not just that the caller can transmit audio voice messages via a telephone, but that he or she can retrieve text and audio messages from a telephone as well. For purely text messages, a voice-to-speech synthesizer can play back received messages over the telephone connection. If a digital audio file is attached, the system can playback the audio file attachment over the telephone system. Of course, this requires additional pre-configuration which may simply comprise the setup variables necessary to access the caller's existing POP3 server. Before the caller can access his or her menu of options, the system notifies the caller that a brief sponsor message will be broadcast 330. The sponsor message may include an option to transfer the caller to its own call center 340. Upon acceptance of the transfer, typically by sending a DTMF signal by depression of a button on the caller's touch tone telephone 350, the caller is transferred to the sponsor's call center 360. Alternatively, should the caller wish to proceed without the transfer, an alternative DTMF signal 370 would pass the caller into the system menu 380 for sending new audio voice messages.

Figure 9:
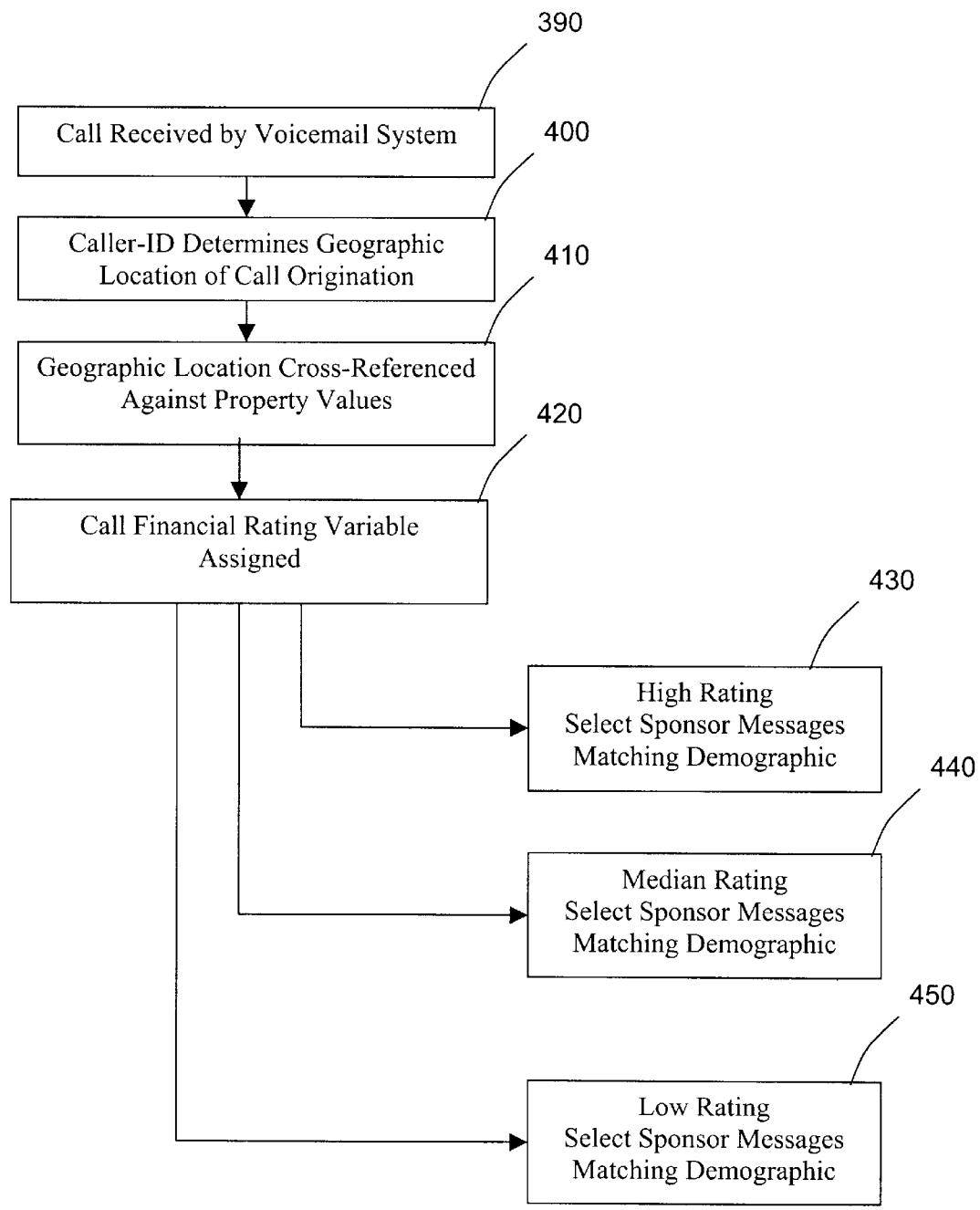
FIG. 9 is a schematic view of an embodiment of the invention wherein caller-ID information is cross-referenced to a property value database that results in a financial rating variable to determine an appropriate sponsor message based on the caller's demographics.

In FIG. 9, a call is received by the system 390 wherein a caller-ID string 400 determines the geographic location where the call originated from. The geographic location is then cross-referenced 410 against property values for that location. A financial rating variable 420 is then assigned to the caller. If the property values for the call's origin are relative high, then sponsor messages are broadcast that match the demographics of a high financing rating variable 430. Median ratings are matched with the appropriate demographic sponsor messages 440 and low financial ratings are also associated with one or more sponsor messages 450.

Figure 10:
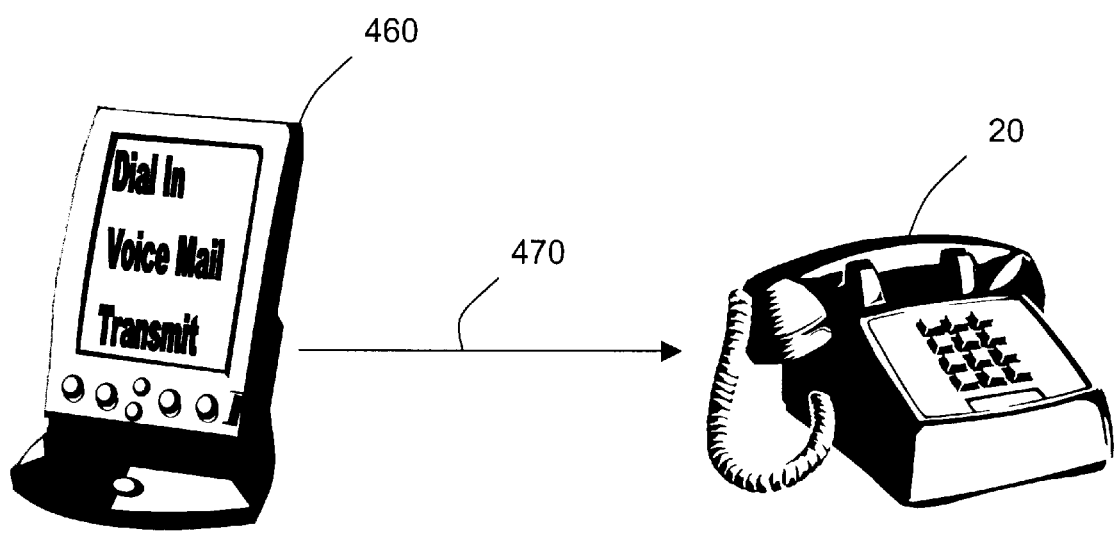
FIG. 10 is a schematic view of a PDA providing DTMF signals to a typical touch-tone telephone in lieu of manual entry by the caller.
Figure 11:
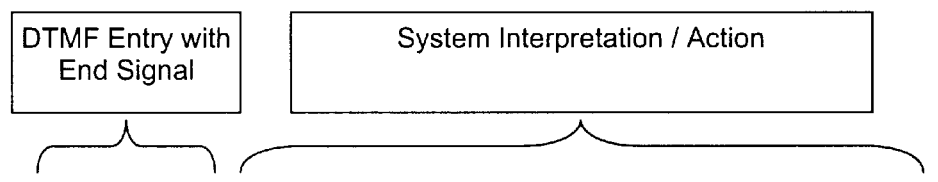
FIG. 11 is a DTMF to alphanumeric character translation table according to one embodiment of the invention wherein an end signal is transmitted after the DTMF coding for the associated alphanumeric character.

PDAs are easily capable of producing the appropriate DTMF signals necessary to resolve the alphanumeric characters in an email address. In FIG. 10, a PDA 460 transmits DTMF signals 470 to a standard touch-tone telephone 20. An advantage of using the PDA is that most PDA include built-in address books wherein email addresses may be easily recalled. Should a PDA be used, a DTMF end signal should be incorporated when resolving the alphanumeric character from the DTMF signals. This is shown in FIG. 11 wherein each subset of DTMF signals is followed by the pound "#" signal (941 and 1477 Hz tones). This permits the PDA to rapidly enter in the preselected email address without having to pause for the wait loop disclosed in FIG. 5.

While voice recognition translation of audio messages to text would be very useful in telecommunication applications, certain logistical considerations remain. There are large variations in the phonetics spoken by individuals which are difficult for software algorithms to interpret correctly and there are tens-of-thousands of words that must be identified and translated for a voice recognition system to be useful in the traditional sense. High CPU and memory requirements, as well as high-quality audio connections often make voice recognition expensive and unreliable.

Figure 12:
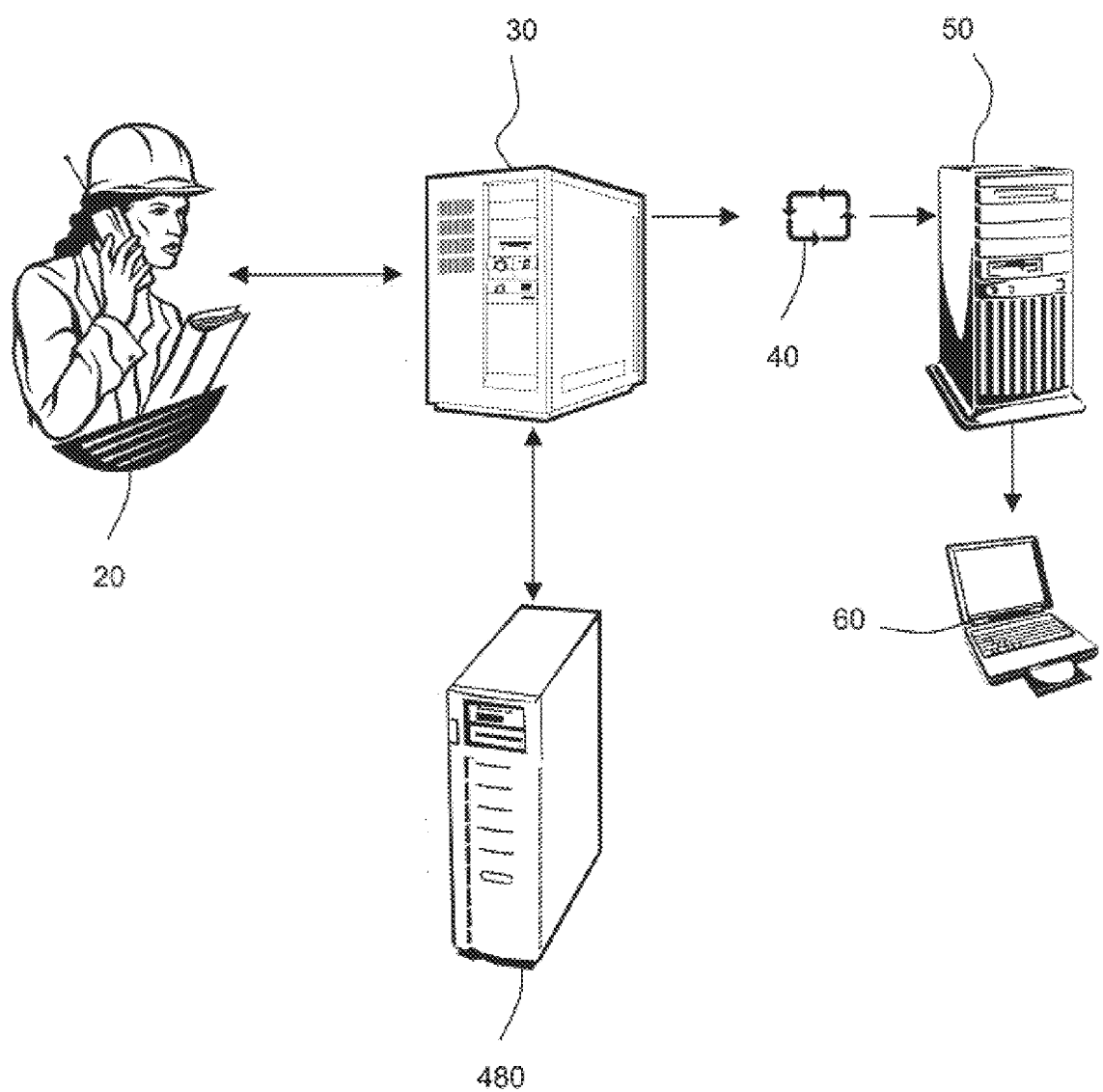
FIG. 12 is a schematic view of an alternative embodiment of the invention incorporating a speech recognition processor for resolving the alphanumeric characters of a preselected email address.

However, rather than interpret thousands of individual words, it is much easier to recognize individual alphanumeric characters spoken into a voice recognition system. An array of 50 alphanumeric characters and associated speech patterns permit the caller 20 in FIG. 12 to forgo manual DTMF entry wherein a call is placed to a voice mail server 30, the spoken, individual alphanumeric characters are interpreted via a voice recognition processor 480 so that a string of alphanumeric characters is assembled into an email address. In FIG. 13, a table is provided showing the steps to a voice recognition entry of the alphanumeric characters comprising an email address. In a preferred embodiment, the caller is not required to individually speak out the ".com" ".net" or ".org" suffixes of most email addresses. Rather, the voice recognition system is provided additional entries to recognize the phonetic equivalents (e.g., "dot com" "dot net" and "dot org").

Figure 14:
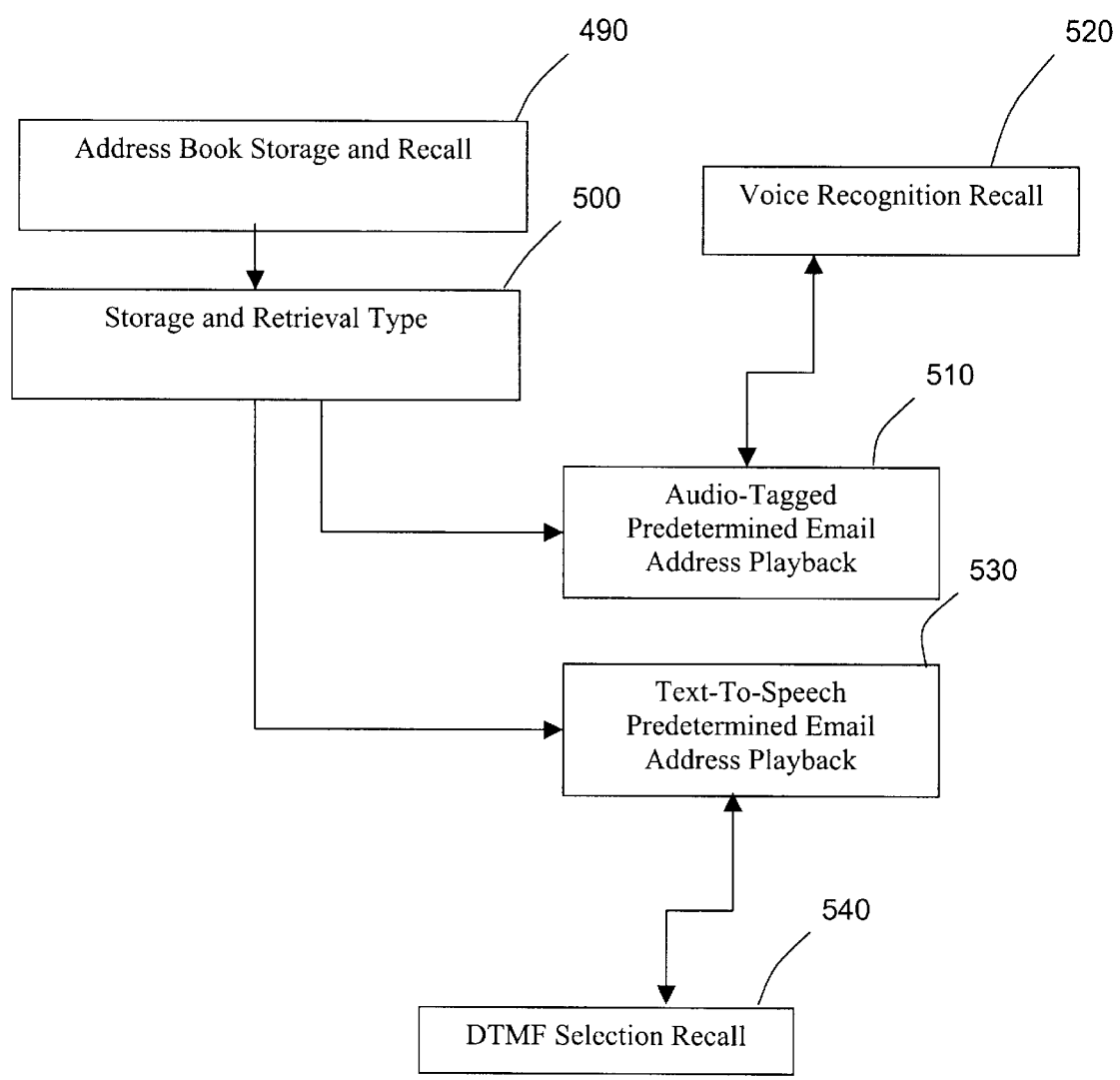
FIG. 14 is a schematic view of a touch-tone operated email address book according to the invention.

FIG. 14 shows an address book feature of the present invention wherein an address book storage and recall menu is accessed 490 and a storage and retrieval type is selected 500. One type of storage and retrieval type may be an audio-tagged email address 510 wherein the caller records a short audio description of the alphanumeric character string representing the email address. For example, the caller might store his grandmother's email address then tag it with an audio clip that plays "grandma." An added benefit to storing a short audio description is that the same description may be retrieved by voice recognition. Alternatively, previously stored email addresses may be reviewed by text-to-speech synthesis 530 of the alphanumeric character string. Should voice recognition not be used, DTMF signals 540 may be used to recall the previously entered email address.

Figure 15:
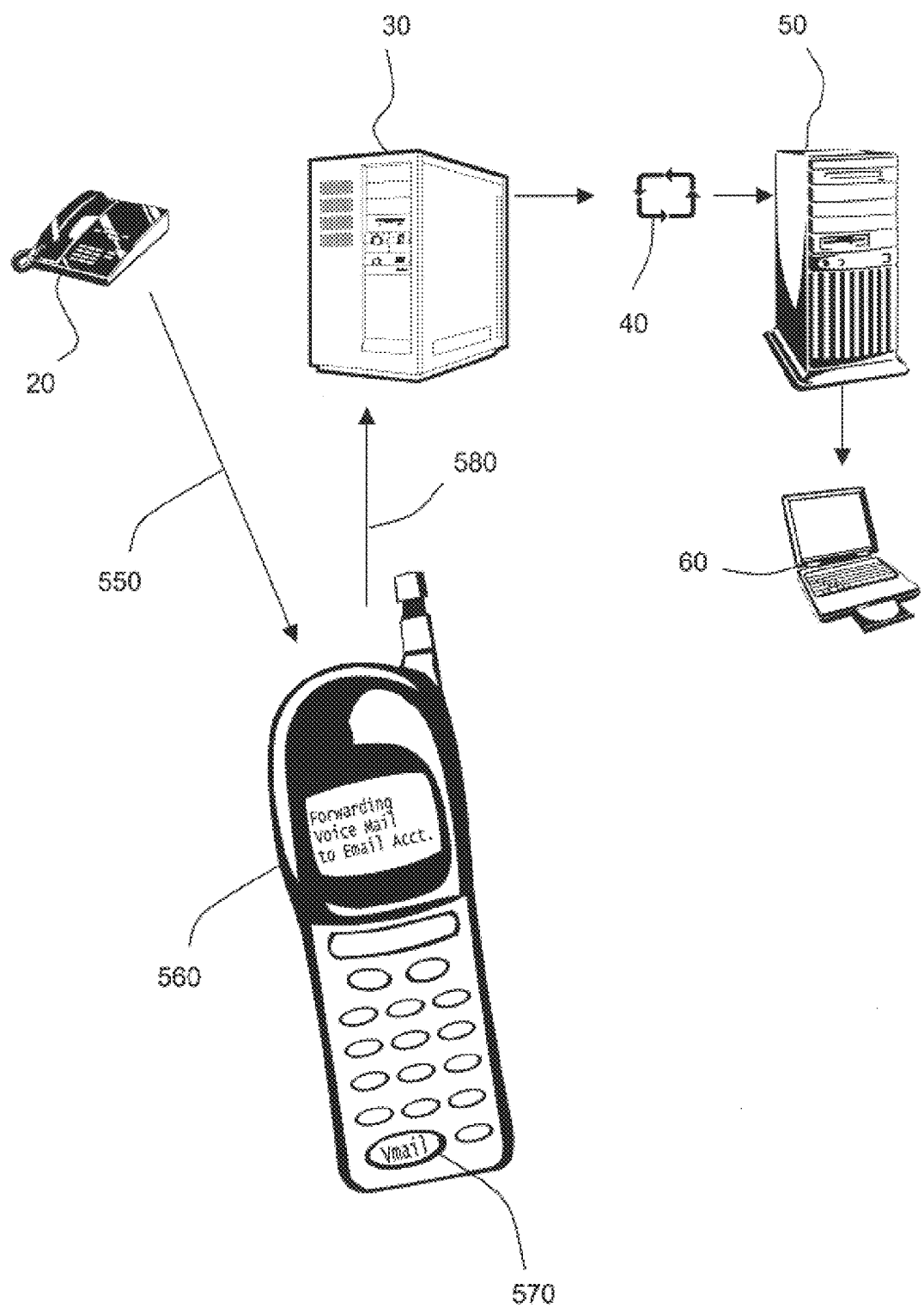
FIG. 15 is a schematic view of a method wherein voice mail delivered to a wireless telephone is forwarded to a voice mail server where it is further packaged into an email attachment.

FIG. 15 shows an alternative embodiment of the invention wherein the caller 20 transmits voice mail 550 to a wireless telephone 560. The wireless telephone 560 is capable of storing one or more predetermined alphanumeric strings which represent one or more email addresses. In a preferred embodiment, a single send key 570 enables the user to immediately forward 580 the current voice mail message stored on his or her wireless telephone to a voice mail server 30 where it is further processed into an email attachment and ultimately delivered to a recipient 60.

Figure 16:
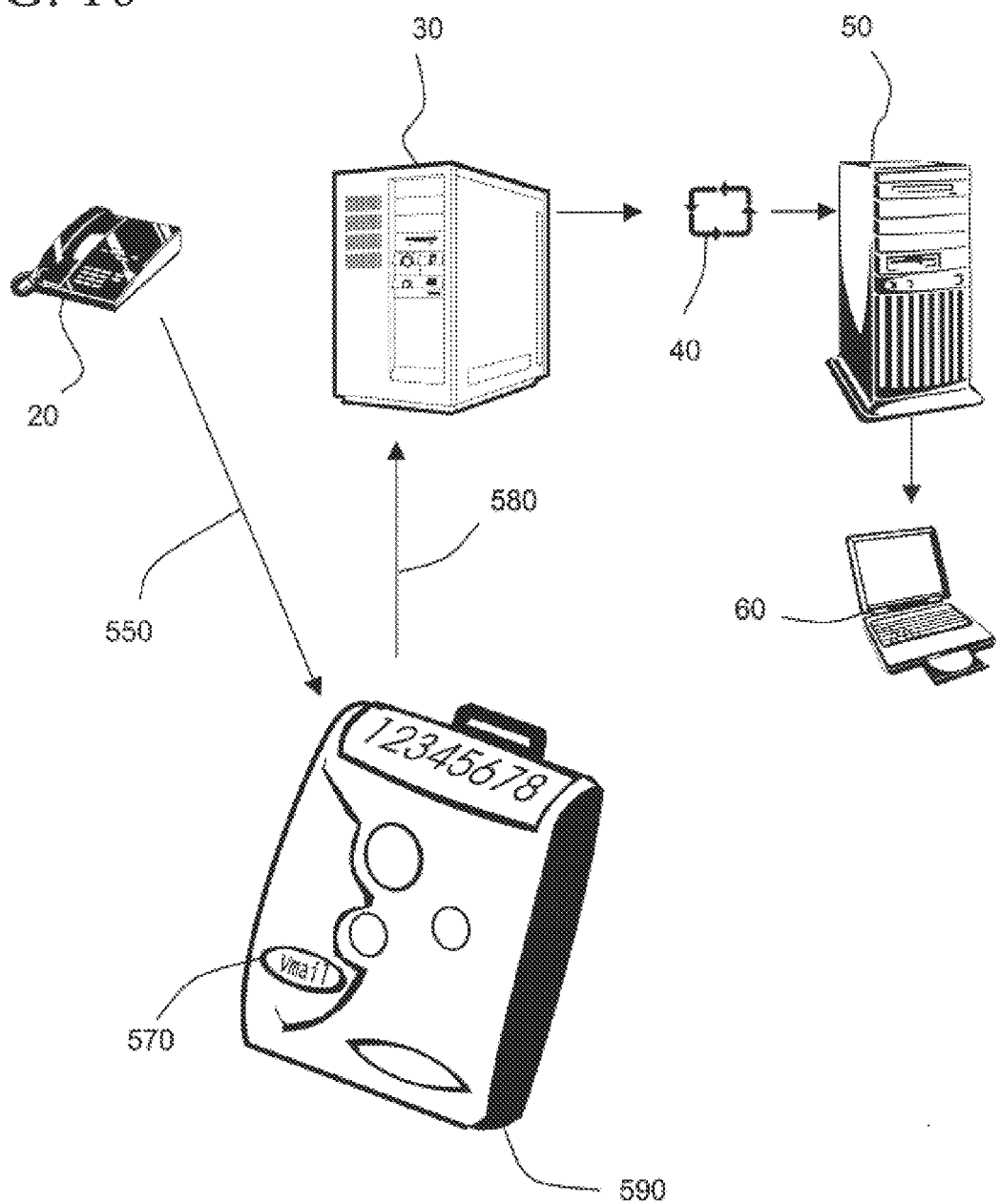
FIG. 16 is a schematic view of a method wherein voice mail delivered to a wireless pager is forwarded to a voice mail server where it is further packaged into an email attachment.

FIG. 16 shows substantially the same method as described in FIG. 15 with the exception that the telecommunication device initially accepting the voice mail is a wireless voice pager 590.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of transmitting one or more audio file attachments in an electronic message from a touch-tone telephone comprising the steps of:

(a) dialing into a predetermined telephone number;

(b) sending an identification code to a central server by sending DTMF signals on said touch-tone telephone;

(c) associating said identification code with a subscriber record;

(d) validating the authenticity of said subscriber record;

(e) authorizing the transmission of said electronic message based upon whether said identification code is authentic;

(f) sending one or more DTMF signals on said touch-tone telephone corresponding to preselected email address wherein said one or more DTMF signals results in a unique selection of a predetermined alphanumeric character;

(g) providing a wait loop of predetermined duration to identify said predetermined alphanumeric character;

(h) identifying said predetermined alphanumeric character according to the number of identical DTMF signals received during said wait loop;

(i) appending said predetermined alphanumeric character as identified at the end of said wait loop;

(j) assembling a string of alphanumeric characters predetermined of said preselected email address;

(k) providing a text-to-speech audio confirmation of said string of alphanumeric characters predetermined of said preselected email address;

(l) prompting for an audio voice message by an automated voice response;

(m) recording said audio voice message;

(n) detecting a DTMF stop signal;

(o) converting said audio voice message into a digital audio file;

(p) attaching said digital audio file to said electronic message directed to said preselected email address;

(q) associating an alphanumeric reply string with said subscriber record;

(r) encoding said alphanumeric reply string into said electronic message in a reply-to field wherein a recipient of said electronic message may send a return electronic message addressed to said alphanumeric reply string; and (s) transmitting said electronic message to said preselected email address.

2. A method of transmitting one or more audio file attachments in an electronic message from a touch-tone telephone comprising the steps of:

(a) dialing into a predetermined telephone number;

(b) sending one or more DTMF signals on said touch-tone telephone corresponding to a preselected email address wherein said one or more DTMF signals is associated with a predetermined alphanumeric character by providing a wait loop of predetermined duration to identify said predetermined alphanumeric character, identifying said predetermined alphanumeric character according to the number of identical DTMF signals received during said wait loop, and appending said predetermined alphanumeric character as identified at the end of said wait loop;

(c) assembling a string of alphanumeric characters by repeating step (b) until said preselected email address has been completed;

(d) recording an audio voice message over said touch-tone telephone;

(e) converting said audio voice message into a digital audio file;

(f) attaching said digital audio file to said electronic message directed to said preselected email address; and (g) transmitting said electronic message to said preselected email address.

3. A method of transmitting one or more audio file attachments in an electronic message from a touch-tone telephone comprising the steps of:

(a) dialing into a predetermined telephone number;

(b) sending one or more DTMF signals on said touch-tone telephone corresponding to a preselected email address wherein said one or more DTMF signals is associated with a predetermined alphanumeric character;

(c) assembling a string of alphanumeric characters by repeating step (b) until said preselected email address has been completed;

(d) recording an audio voice message over said touch-tone telephone;

(e) converting said audio voice message into a digital audio file;

(f) attaching said digital audio file to said electronic message directed to said preselected email address;

(g) transmitting said electronic message to said preselected email address;

(h) playing an audio sponsor message upon making a connection to said predetermined telephone number;

(i) selecting said audio sponsor message from an array of audio sponsor messages according to one or more demographic factors of the caller, wherein said one or more demographic factors are resolved from a caller-ID string;

(j) cross-referencing said caller-ID string against relative property values of the origin of the call;

(k) assigning a financial rating variable; and (l) selecting said audio sponsor message from said array of audio sponsor messages according to said financial rating variable.

4. A method of transmitting one or more audio file attachments in an electronic message from a telephone comprising the steps of:

(a) dialing into a predetermined telephone number;

(b) receiving one or more speech elements through said telephone;

(c) associating each individual speech element with one or more predetermined alphanumeric characters through a speech recognition means;

(d) assembling a string of alphanumeric characters by repeating steps (b) through (c) until a preselected email address has been completed by providing a wait loop of predetermined duration to identify said predetermined alphanumeric character, identifying said predetermined alphanumeric character according to said one or more speech elements received during said wait loop, and appending said predetermined alphanumeric character as identified at the end of said wait loop;

(e) recording an audio voice message over said telephone;

(f) converting said audio voice message into a digital audio file;

(g) attaching said digital audio file to said electronic message directed to said preselected email address; and (h) transmitting said electronic message to said preselected email address.

\* \* \* \* \*